US012188267B2

(12) United States Patent
Fuchs

(10) Patent No.: US 12,188,267 B2
(45) Date of Patent: Jan. 7, 2025

(54) MOTOR VEHICLE LOCK

(71) Applicant: Kiekert AG, Heiligenhaus (DE)

(72) Inventor: Carsten Fuchs, Essen (DE)

(73) Assignee: Kiekert AG, Heiligenhaus (DE)

( * ) Notice: Subject to any disclaimer, the term of this patent is extended or adjusted under 35 U.S.C. 154(b) by 246 days.

(21) Appl. No.: 17/783,877

(22) PCT Filed: Dec. 9, 2020

(86) PCT No.: PCT/DE2020/101042
§ 371 (c)(1),
(2) Date: Jun. 9, 2022

(87) PCT Pub. No.: WO2021/115537
PCT Pub. Date: Jun. 17, 2021

(65) Prior Publication Data

US 2023/0014292 A1 Jan. 19, 2023

(30) Foreign Application Priority Data

Dec. 10, 2019 (DE) ..................... 10 2019 133 654.6

(51) Int. Cl.
*E05B 81/16* (2014.01)
*E05B 77/06* (2014.01)
(Continued)

(52) U.S. Cl.
CPC .............. *E05B 81/16* (2013.01); *E05B 77/06* (2013.01); *E05B 81/06* (2013.01); *E05B 81/34* (2013.01); *E05B 81/42* (2013.01); *E05B 81/90* (2013.01)

(58) Field of Classification Search
CPC .......... E05B 81/06; E05B 81/14; E05B 81/16; E05B 81/34; E05B 81/42; E05B 81/90; E05B 77/02; E05B 77/04; E05B 77/06
See application file for complete search history.

(56) References Cited

U.S. PATENT DOCUMENTS

2003/0116977 A1* 6/2003 Erices ..................... E05B 81/14 292/201
2015/0021934 A1* 1/2015 Barmscheidt ........... E05B 81/90 292/336.3
2017/0159331 A1* 6/2017 Handke .................. E05B 81/16

FOREIGN PATENT DOCUMENTS

DE 10048709 A1 4/2002
DE 202012003171 U1 7/2013
(Continued)

OTHER PUBLICATIONS

International Search Report mailed Mar. 26, 2021, for priority International Patent Application No. PCT/DE2020/101042.

*Primary Examiner* — Christine M Mills
*Assistant Examiner* — Christopher F Callahan
(74) *Attorney, Agent, or Firm* — Renner, Otto, Boisselle & Sklar, LLP

(57) ABSTRACT

A motor vehicle lock, in particular an electrically actuatable motor vehicle lock, comprising a locking mechanism having a rotary latch and at least one pawl, a release lever, wherein the release lever can be actuated by means of an electric drive unit and at least one manually actuatable actuating lever, and wherein the release lever interacts with the locking mechanism in such a way that a blocked locking mechanism can be unblocked, and a locking unit, wherein manual unblocking of the locking mechanism can be prevented by means of the locking unit, and wherein simultaneous locking of the actuating lever and unblocking of the locking mechanism can be made possible by means of the drive unit.

13 Claims, 3 Drawing Sheets

(51) Int. Cl.

| | |
|---|---|
| ***E05B 81/06*** | (2014.01) |
| ***E05B 81/34*** | (2014.01) |
| ***E05B 81/42*** | (2014.01) |
| ***E05B 81/90*** | (2014.01) |

(56) References Cited

FOREIGN PATENT DOCUMENTS

| | | | | | |
|---|---|---|---|---|---|
| DE | 102012003743 | A1 * | 8/2013 | ............. | E05B 77/04 |
| DE | 102013110201 | A1 | 3/2015 | | |
| DE | 102015108739 | A1 | 12/2016 | | |
| DE | 102017102549 | A1 | 8/2018 | | |
| EP | 1045093 | A2 * | 10/2000 | ............. | E05B 81/14 |
| EP | 3173554 | A1 | 5/2017 | | |
| WO | 2019076399 | A1 | 4/2019 | | |

* cited by examiner

MOTOR VEHICLE LOCK

This application is a national phase of International Patent Application No. PCT/DE2020/101042 filed Dec. 9, 2020, which claims priority to German Patent Application No. 10 2019 133 654.6 filed Dec. 10, 2019, each of which is hereby incorporated herein by reference in its entirety.

FIELD OF DISCLOSURE

The invention relates to a motor vehicle lock, in particular an electrically actuatable motor vehicle lock, comprising a locking mechanism having a rotary latch and at least one pawl, a release lever, wherein the release lever interacts with the locking mechanism in such a way that a blocked locking mechanism can be unblocked, and wherein the release lever can be actuated by means of an electric drive unit and at least one manually actuatable actuating lever, a locking unit, wherein manual unblocking of the locking mechanism can be prevented by means of the locking unit.

BACKGROUND OF DISCLOSURE

In order to increase comfort, more and more assistance systems are being integrated into today's motor vehicles, which systems increase safety but also increase comfort when operating the motor vehicle. It is thus known to actuate the locking systems used in the doors, sliding doors, or flaps electrically. If, for example, a handle, i.e. an outside door handle of a side door, is pulled, the outside door handle can be used to generate a signal which initiates electrical opening of the locking device, so that the operator only has to generate the control signal in order to be able to open the door. This allows the operator to open the door, sliding door, or flap easily and conveniently.

An electrically actuatable locking device is known from DE 10 201 108 739 A11. The document discloses a method for controlling a motor vehicle door lock comprising a locking mechanism, an electric drive, in which the locking mechanism is unblocked by means of the electric drive. In particular, the locking mechanism is assigned to a locking mechanism sensor, wherein the drive is able to be activated or deactivated depending on the switching position of the locking mechanism sensor.

DE 20 2012 003 171 U1 discloses a motor vehicle door lock comprising a locking mechanism, further comprising an electric drive for the locking mechanism and a child safety member having an associated sensor, wherein the electric drive for opening the locking mechanism can be activated or deactivated depending on the queried position. In addition to the child safety device, the motor vehicle door lock has a drive unit consisting of an electric motor, a worm, and an output pulley, wherein a release lever can be actuated by means of the output pulley, and the release lever can unblock a blocked locking mechanism. The electrically actuatable locking device or the motor vehicle door lock can be opened in an electrically actuated manner by means of an initialization of a sensor, for example by means of an inside door handle or an outside door handle. In any case, however, a mechanical connection between the inside actuating lever and the outside actuating lever and the release lever can be produced.

The generic state of the art is formed by DE 10 2012 003 743 A1. The document discloses an electrically actuatable motor vehicle lock comprising a locking mechanism having a rotary latch and at least one pawl, a release lever, wherein a blocked locking mechanism can be unblocked by means of the release lever, an electric drive unit having a motor and an output pulley driven by the motor, wherein the release lever can be actuated by means of the output pulley. The drive unit can be initialized using a signal generator. In this case, the initialization can be carried out by means of a handle, for example an outside door handle or an inside door handle.

SUMMARY OF DISCLOSURE

The state of the art has proven itself in principle. Developers are always striving to develop smaller, lighter, and more compact locking systems so that, on the one hand, costs can be reduced and, on the other hand, the space requirement and the weight of the locking system and thus of the motor vehicle can be reduced. In addition to these development goals, the functionality of the motor vehicle lock must always be ensured and security measures must be able to be observed. This is the starting point for the invention.

Based on the known state of the art, the object is to provide an improved motor vehicle lock. In particular, the object of providing a simplified motor vehicle lock with a small number of components arises. In addition, there is the object of providing a cost-effective and structurally simple solution for actuating an electrically opening lock.

The object is achieved by the features of the independent claim 1. Advantageous embodiments of the invention are specified in the dependent claims. It should be noted that the exemplary embodiments described below are not limiting; rather, any possible variations of the features described in the description, the dependent claims, and the drawings are possible.

According to claim 1, the object of the invention is achieved in that a motor vehicle lock, in particular an electrically actuatable motor vehicle lock, is provided, comprising a locking mechanism having a rotary latch and at least one pawl, a release lever, wherein the release lever interacts with the locking mechanism in such a way that a blocked locking mechanism can be unblocked, and wherein the release lever can be actuated by means of an electric drive unit and at least one manually actuatable actuating lever, a locking unit, wherein manual unblocking of the locking mechanism can be prevented by means of the locking unit, and wherein simultaneous locking of the actuating lever and unblocking of the locking mechanism can be made possible by means of the drive unit. The inventive design of the motor vehicle lock now gives the opportunity to provide locking of the manual actuating chain with the smallest possible number of components and, simultaneously, to electrically open the locking mechanism.

According to the invention, the drive unit is able to hold the locked locking system in the locked position and, simultaneously, to actuate the release lever in such a way that the pawl is lifted off the rotary latch. The drive unit therefore has a dual function.

On the one hand, the drive unit locks the motor vehicle lock, wherein an unlocked and locked state of the motor vehicle lock is adjustable, and on the other hand, the drive unit can actuate the release lever directly. In other words, the door lock remains locked even during electrical opening.

If, according to the invention, a motor vehicle lock is mentioned, synonyms such as locking device, door lock, or locking means have the same meaning next to each other. The term "motor vehicle lock" also includes those locks that are used in doors, sliding doors, flaps, and/or covers in the motor vehicle lock, wherever components that are pivotably or slidably attached to the motor vehicle have to be held securely in their position. The motor vehicle lock according to the invention preferably relates to a side door. Motor vehicle locks of this type comprise a locking mechanism consisting of rotary latch and at least one pawl.

The locking mechanism can be equipped with two or more pawls or, for example, have a ratchet lever or blocking lever. Locking mechanisms are preferably used which have a pre-ratchet position and a main ratchet position. In particular in the main ratchet position, in which the locking system is in the maximum closed position, an opening torque is preferably set in the locking mechanism. An opening torque is understood to mean in this case that, in the main ratchet position, a torque is set in the locking mechanism, which torque acts from the ratchet position on the pawl which is engaged with the rotary latch. The locking mechanism thus strives by itself in an opening direction. In order to secure the pawl in the ratchet position in the case of an opening torque, so-called two-pawl locking mechanisms are used, wherein another pawl, which can also be described as a ratchet lever or blocking lever, secures the pawl engaged with the rotary latch in the ratchet position thereof. Locks of this type have the advantage that, in order to open the locking mechanism, only the second pawl or the ratchet lever or blocking lever has to be moved out of engagement with the first pawl in order to open the locking mechanism. To move the second pawl or the ratchet lever or blocking lever, very low forces are required, which forces are preferably provided by means of the electric drive unit. The release lever thus primarily acts on the second pawl, but it can act, preferably downstream, on the first pawl for securing.

The release lever is preferably pivotably mounted in the motor vehicle lock and interacts directly with the locking mechanism. The release lever can act on the first and/or second pawl or the ratchet lever or blocking lever, wherein the ratchet lever or blocking lever, for example, can be pivoted by means of the release lever, so that a locking mechanism can be opened independently with an opening torque. Of course, the release lever can also act directly on the pawl engaged with the rotary latch, so that the blocked locking mechanism can be unblocked. The release lever can be actuated manually by means of an actuating lever, or there is a drive unit in the motor vehicle lock that acts on the release lever. A manual actuation of the release lever can be carried out by the inside actuating lever or the outside actuating lever as a direct manual intervention. The reverse drive of the drive from the electrical opening direction is realized via a spring assigned to the release lever, since said spring is present per se; the drive force is not reduced in this case and the number of components remains the same. In general, the locking system can also be constructed in such a way that it remains coupled when there is a movement on the outside actuating lever and remains disengaged when the control lever is blocked.

A locking unit is also regularly included in the lock, wherein manual actuation of the release lever can be prevented by means of the locking unit. The locking unit thus interrupts the manual actuating lever chain, an interruption of the outer actuating lever chain being referred to as locking, whereas interrupting the inside actuating lever chain forms an anti-theft device. By means of the design of the motor vehicle lock according to the invention, the locking and also the unblocking of the locking mechanism can take place simultaneously and by means of the drive unit.

In a further embodiment variant of the invention, the drive unit has an electric drive, a drive gear, an output pulley, and at least one control member. The drive unit comprises an electric drive, preferably an electric DC motor, on the output shaft of which a drive gear, preferably a worm gear of a downstream transmission stage, is fastened. The drive gear interacts with an output pulley to form the transmission, wherein the output pulley preferably interacts with a control member. The motor vehicle lock can be locked or unlocked by means of the control member.

Advantageously, no coupling lever is actively moved for locking and unlocking; there is no engaging or disengaging. Rather, the control lever is deprived of a degree of freedom; the control lever is blocked. This blocking in turn has an advantageous effect on the acoustics and the balance of power, since the entire torque of the drive unit can be used for electrical opening and no additional control members have to be moved.

Simultaneously, it is possible to actuate the release lever by means of the control member, as a result of which unblocking of the locking mechanism can be initiated or carried out. The drive unit is controlled by means of a control unit belonging to the motor vehicle, wherein a control signal for opening the lock or for unblocking the locking mechanism can be given, for example, by means of an outside or inside door handle, as well as, for example, by means of a sensor signal, wherein, for example, a touch sensor can be arranged in or motor vehicle. The drive unit is controlled in order to initiate unblocking of the locking mechanism by means of the downstream transmission and the control member. It is also conceivable according to the invention that the output disk and the control member are designed in one piece, wherein a control contour on the output pulley, for example, can act directly on the release lever.

If the actuating lever can engage with the release lever by means of a control lever, a further variant of the invention results. An arrangement of a control lever between the actuating lever and the release lever makes it possible for the actuating lever to be decoupled from the control lever. The control lever can thus interrupt the actuating lever or the actuating lever chain towards the release lever, for example by means of a coupling lever. A control means is thus made available with which a further securing means for the locking system can be made available. In this case, the coupling lever can be mounted on the actuating lever and be guided in a control curve of the control lever. If the control lever is now fixed by means of the drive unit, the position of the coupling lever can be guided, for example, by means of a control contour in the control lever, and the actuating lever chain can be interrupted from the actuating lever towards the release lever. Thus, the actuating lever chain can be interrupted, in particular with the help of the drive unit, by means of the control lever. Consequently, locking of the locking system is possible by means of the drive unit. The outside actuating lever chain is preferably interrupted so that the locking system is locked. Of course, it is also conceivable that the actuating lever chain is interrupted in such a way that an inside actuating lever chain can also be blocked or interrupted in the course of the force, so that anti-theft protection can also be implemented.

In one embodiment of the invention, the control lever can be blocked and released by means of the control member. The drive unit comprises an electric motor, having a downstream transmission and a control member, wherein manual unblocking of the locking mechanism can be prevented by means of the control member. The control lever is part of a securing unit consisting of a control unit, a coupling lever, and an actuating lever. According to the invention, the control member acts on the control lever and can release or block a movement of the control lever. The control member thus has a dual function. On the one hand, unblocking of the locking mechanism can be initiated by means of the control member, and on the other hand, the manual unlocking of the locking mechanism can be prevented or enabled by means of the control member. The control member is preferably pivotable, i.e. it is accommodated in the motor vehicle lock so as to be pivoted about an axis. The control member can be pivoted by means of a movement initiated by means of the electric motor in such a way that it is disengaged from the control lever, as a result of which the control lever is released. On the other hand, the control member can also be moved into a position in which the control member blocks a movement of the control lever. In the blocking position of the control member, the motor vehicle lock is locked or locked and secured against theft.

A middle position of the control member can be secured by a securing member, i.e. a flexible lock or a spring member. This also applies to the end position, for example in the unlocked position.

It is also an embodiment variant of the invention if the release lever can be actuated by means of the control member. The control member can interact directly with the release lever, wherein a pivoting movement of the control member results in a pivoting movement of the preferably pivotable release lever accommodated motor vehicle. As already explained above, the release lever acts directly on the locking mechanism and preferably on at least one pawl. The control member can be designed as a separate control member and can be driven by means of the transmission downstream from the electric motor or is directly part of the transmission, wherein the control member is embodied, for example, as an extension of the output gear of the transmission. The release lever has, for example, an extension that extends into the pivoting range of the control member, so that, in a preferred embodiment, the release lever can be stored in the motor vehicle together with the control lever and the actuating lever. This design, i.e. the shared mounting of the release lever, control lever, and actuating lever, in understood to mean that the motor vehicle lock can be extremely compact, and the number of components required to provide multiple functions in the motor vehicle can be reduced to a minimum by driving the release lever according to the invention by means of the drive unit.

If the control member can engage with the release lever in such a way that the control member blocks a movement of the control lever during actuation of the release lever, this results in a further embodiment variant of the invention. The control member is pivotably mounted in the motor vehicle lock and preferably in a housing of the motor vehicle lock and/or in a lock plate of the motor vehicle lock. In this case, the separately designed control member can also be mounted together with the output pulley or output gear of the drive unit. The control member moves the release lever so that the locking mechanism can be unblocked. During the movement of the control member and thus during the unblocking of the locking mechanism, the control member remains engaged with the control lever. The control lever thus remains in a blocked position during the releasing, so that the motor vehicle lock is still locked. The structural design of the motor vehicle lock according to the invention allows the number of components required for locking the motor vehicle and unblocking the locking mechanism to be reduced to a minimum. Simultaneously, additional functions, such as a mass inertia-based securing system, can be integrated into the motor vehicle lock by controlling the actuation of the control lever according to the invention.

Advantageously, the control member can engage with a control contour of the control lever during actuation of the release lever. Blocking of the movement of the control lever can be realized by a control contour on the control lever in conjunction with a control cam on the control member. Advantageously, a control cam is formed or attached to the control member, which control cam engages with a control contour on the control lever. In an advantageous manner, a continuous limitation of the movement of the control lever can thus be implemented during the releasing of the locking mechanism. It is also conceivable that friction partners are attached to the control cam and/or to the control contour, which friction partners allow an easy, low-noise, and/or friction-reducing interaction between the control contour and control cam. For example, the control cam can have a coating and/or be made of a different material in some regions. The control cam preferably sweeps over the control contour during the entire movement of the release lever, so that the control cam is continuously engaged with the control contour over the entire pivoting angle for actuating the release lever.

In a further embodiment variant of the invention, it is advantageous if the control member can be transferred by means of the drive unit into a release position in which the control lever can be released and into a blocking position in which the control lever can be blocked. The control member controls the movement of the control lever and is able to lock and/or unlock the motor vehicle lock. The locking takes place in that the control lever is released or a movement of the control lever is blocked. The control member is pivoted by means of the drive unit in such a way that the control member is transferred to a release position in which the control lever can be actuated without hindrance. The control lever interacts with the actuating lever in such a way that a coupling lever is arranged between the control lever and the actuating lever, wherein the coupling lever is engaged with the release lever when the actuating lever is in the unactuated state. Now, if the actuating lever is actuated with a conventional actuation speed, the coupling lever engages with the release lever and unblock the locking mechanism. If, on the other hand, the control lever is blocked in the movement thereof by means of the control member, then, when the actuating lever is moved, the coupling lever is guided in a control curve in such a way that the coupling lever is deflected, as a result of which a movement of the actuating lever runs idle, i.e. the release lever is not actuated. By blocking the control lever, the actuating lever can thus be rendered inoperative.

It can also be advantageous if the control lever interacts with a mass inertia-based securing system. In addition to the locking function, which can be implemented by blocking the movement of the control lever, the control lever can also interact with a mass inertia member. If the motor vehicle lock is in an unlocked state, for example, and there is a pulse-like impact on the motor vehicle lock, such as can be initialized by an accident, for example, the mass inertia-based securing system prevents the control lever from moving. If, for example, an external actuating handle is actuated by the impulse acting on the motor vehicle, a mechanical connection between the external handle and the actuating lever can result in an actuation of the actuating lever. In this case, the mass member counteracts the impulse and keeps the control lever in the starting position thereof. The control lever controls the movement of the coupling lever between the control lever and the actuating lever and deflects the coupling lever in such a way that the release lever is not blocked. The coupling lever is pivotably accommodated on the actuating lever and is also guided in a control curve of the control lever.

If the actuating lever is now deflected by the impulse on the motor vehicle, the coupling lever is guided in the control curve in such a way that the coupling lever does not engage with the release lever. The mass member prevents the movement of the control lever, wherein the mass inertia member counteracts the pulse in the motor vehicle and holds the control lever in the starting position thereof. The control lever is coupled to the outside operating lever via a non-positive connection, so that the control lever performs the same movement as the outside actuating lever. If the movement of the control lever is blocked, the coupling lever is pivoted out via a control contour on the control lever and by means of the movement of the movement of the outside actuating lever.

The unlocked system can be synchronized via an electrical opening run and is locked again after the electrical opening run has been carried out. In addition or as an alternative, there is also the possibility of attaching a mass lever to the control lever in order to implement a crash lock, as for example in DE 10 2017 102 549 A1, the disclosure content of which with regard to the integration of the mass inertia lever is hereby explained in full as the subject matter of the application.

The design of the motor vehicle lock according to the invention and in particular the advantageous refinements of the construction according to the invention make it possible to provide a locking mechanism that locks, releases, and secures the motor vehicle lock with the smallest possible number of components. In particular, additional mechanisms, such as separate locking mechanisms, can be dispensed with.

The invention is explained in more detail below with reference to the attached drawings on the basis of a preferred exemplary embodiment. However, the principle applies that the exemplary embodiment does not limit the invention, but is merely an advantageous embodiment. The features shown can be implemented individually or in combination with further features of the description as well as the claims, individually or in combination.

DETAILED DESCRIPTION

Figure 1:
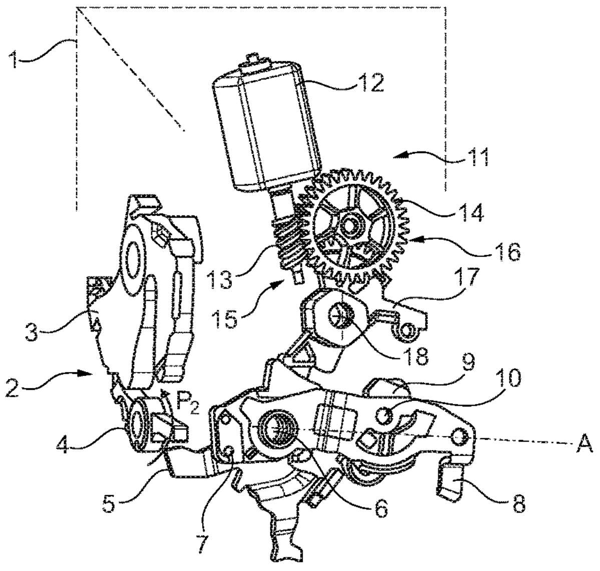
FIG. 1 is a three-dimensional representation of a motor vehicle lock constructed according to the invention, with only the components of the motor vehicle necessary for explaining the invention being reproduced in one embodiment.

FIG. 1 shows a three-dimensional view of a motor vehicle lock 1 with the components that are substantial to the invention. A locking mechanism 2 consisting of a rotary latch 3 and a pawl 4 can be unblocked by means of a release lever 5, wherein the locking mechanism 2 is in a main ratchet position. The release lever 5 is mounted in the motor vehicle lock 1 about a common axis 6 with the control lever 7 and an actuating lever 8. A coupling lever 9 is accommodated in the actuating lever 8 so as to be pivotable about an axis 10. In this exemplary embodiment, the drive unit 11 has an electric motor 12, on the output shaft of which a worm gear 13 is arranged, wherein the worm gear 13 forms a first transmission stage 15 with an output gear 14. By means of a further transmission stage 16, the output gear 14 interacts with a control member 17. The control member 17 in turn is accommodated in the motor vehicle lock 1 so as to be pivoted about the axis 18, wherein the control member 17 interacts with the control lever 7.

FIG. 1 shows the locking mechanism 2 in a main ratchet position, wherein the rotary latch 3 is shown by means of the pawl 4 in the main ratchet position and thus, for example, a closed door. The actuating lever 8 is in an unactuated starting position A. FIG. 1 thus shows the unactuated motor vehicle lock 1 in a locked position.

Figure 2:
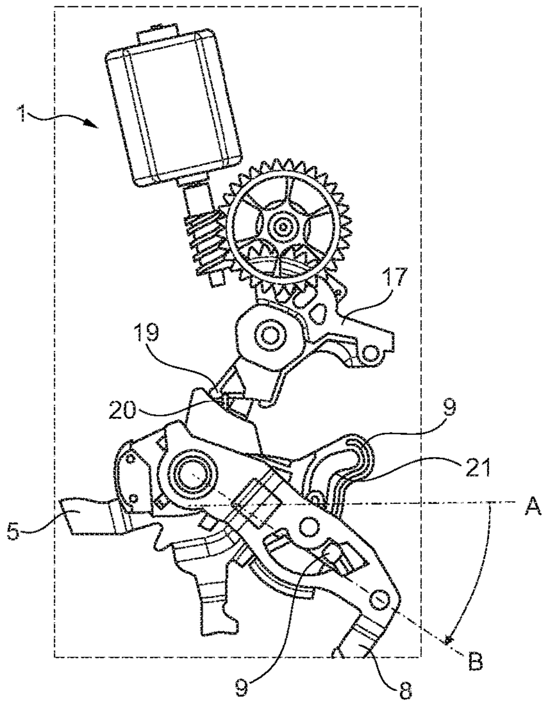
FIG. 2 is a top view of the drive unit according to FIG. 1 in a locked position of the motor vehicle lock with a deflected, i.e. actuated, actuating lever.

Starting from the unactuated position of the actuation lever 8 shown in FIG. 1, FIG. 2 shows the position of the actuation lever 8 in which the actuating lever 8 is pivoted into the actuation position B thereof. This can be done, for example, by actuating the outside door handle, wherein an outside door handle is actuated, for example, by means of a Bowden cable with the actuating lever and/or an outside actuating lever in the motor vehicle lock. The motor vehicle lock 1 is in the locked state, wherein the control member 17 fixes the control lever 7 in the unactuated position thereof. For this purpose, the control member 17 has a control cam 19 which interacts with a control contour 20 on the control lever 7. The control cam 19 fixes the control lever 7 in the starting position A thereof, so that the coupling lever 9 pivotably mounted in the actuating lever 8 is deflected. The coupling lever 9 is thereby deflected by a control curve 21 so that the coupling lever 9 does not engage with the release lever 5. This case can occur, for example, when a user pulls on the outside door handle or inside door handle, as a result of which the actuating lever 8 is pivoted. The actuation of the inside door handle or outside door handle runs therefore idle.

Figure 3:
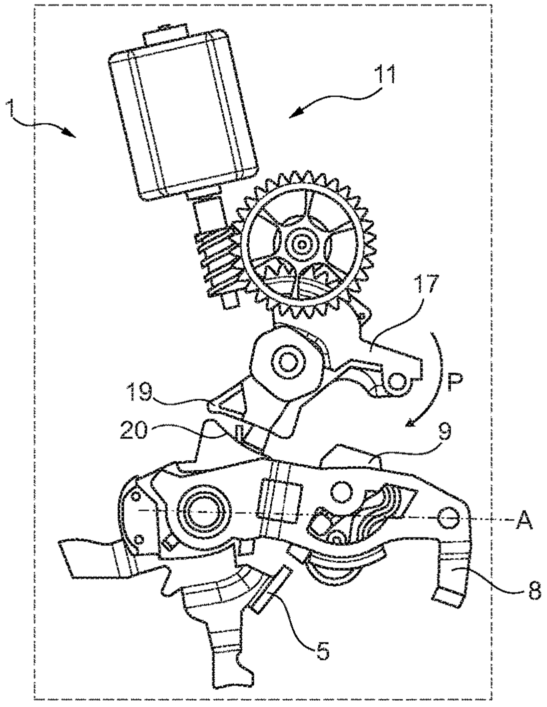
FIG. 3 shows the motor vehicle lock in an unlocked position and an unactuated actuating lever.

FIG. 3 shows the motor vehicle lock 1 in an unlocked position, so that a manual unblocking of the locking mechanism 2 can be made possible. In order to transfer the motor vehicle lock 1 into an unlocked state, the control member 17 was pivoted in the direction of the arrow P1 by means of the drive unit 11. By pivoting the control member 17, the control cam 19 moves out of engagement with the control contour 20. The actuating lever 8 is in the starting position A thereof and the coupling lever 9 is engaged with the release lever 5. The motor vehicle lock 1 can thus be unblocked manually via the actuating lever 8, for example by means of an inside door handle or an outside door handle.

Figure 4:
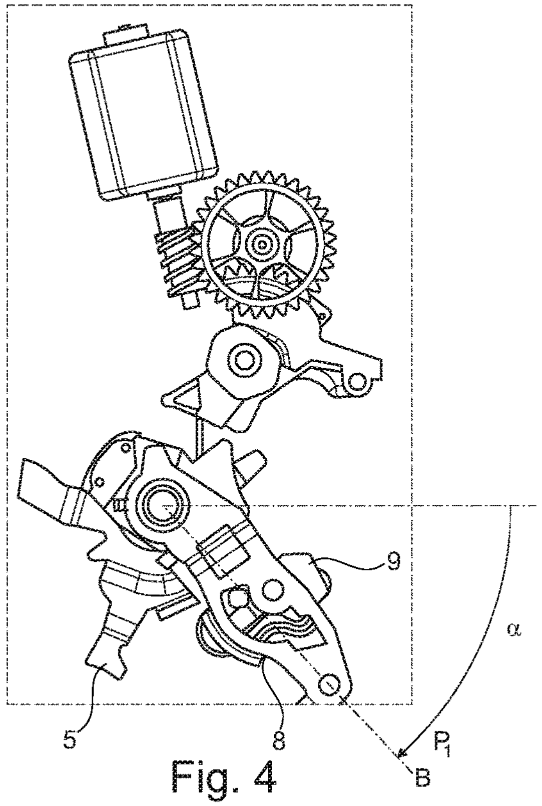
FIG. 4 shows the motor vehicle lock according to the invention in an unlocked position and with a pivoted actuating lever.

FIG. 4 shows the manual unblocking of the locking mechanism, wherein the actuating lever 8 has pivoted the release lever 5 by means of the coupling lever 9. The actuating lever 8 was pivoted from the starting position 8 thereof in the direction of the arrow P1 by the angle α. The angle α can be, for example, a pivot angle of 20 to 50 degrees and preferably a pivot angle of 25 to 40 degrees, and even more preferably a pivot angle of about 30 degrees. By manually moving the actuating lever 8, the release lever 5 was pivoted in such a way that the pawl 4 was pivoted in the direction of the arrow P2, as can be seen in FIG. 1, so that the pawl 4 is disengaged from the rotary latch 3.

Figure 5:
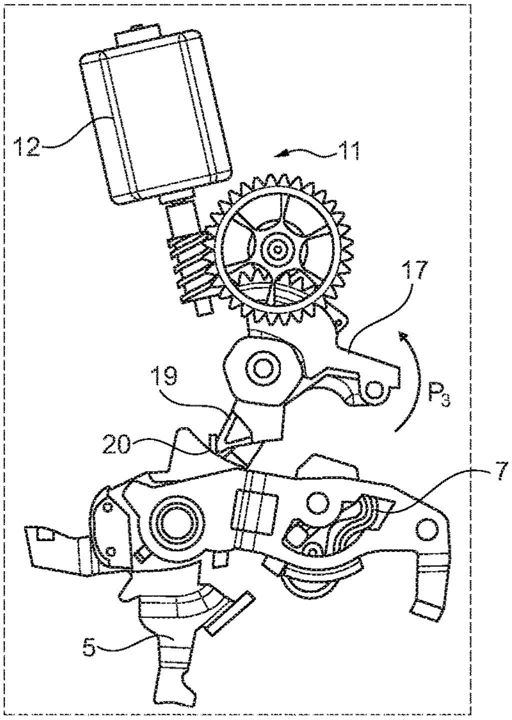
FIG. 5 shows the motor vehicle lock according to the invention in the locked position with a partially actuated release lever.

FIG. 5 now shows the electrical unblocking of the locking mechanism by means of the drive unit 11. The lock 1 is in a locked position since the control cam 19 is engaged with the control contour 20. FIG. 5 shows the state in which the control member 17 has already been pivoted by means of the electric motor 12, specifically in the direction of the arrow P3. When the control member 17 is pivoted, the control member 17 engages with the release lever 5 or maintains engagement with the release lever 5 and moves the release lever 5 in a clockwise direction. Due to the continuous engagement of the control cam in the control contour 20, the control lever 7 is held in the starting position thereof, so that a manual opening of the motor vehicle lock 1 can be prevented. During the entire movement of the control member, the control cam 19 remains in contact with the control contour 20 or prevents the control lever 7 from moving, so that there is a continuously locked state during the releasing of the locking mechanism 2.

Figure 6:
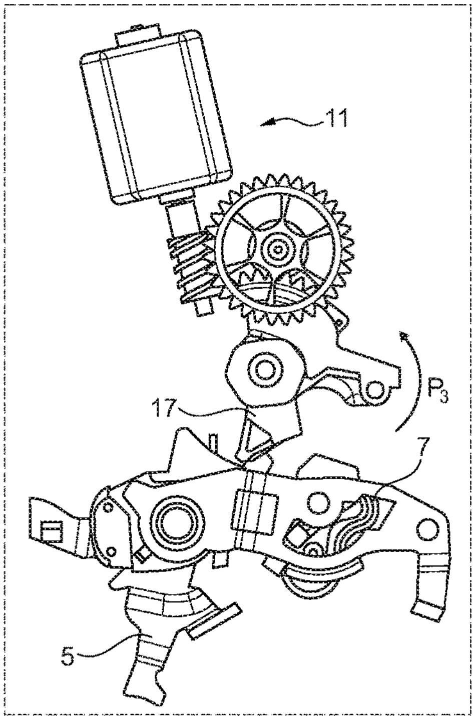
FIG. 6 shows the motor vehicle lock according to the invention in the locked position with a fully actuated release lever.

FIG. 6 shows the unblocking of the locking mechanism by means of the drive unit 11, wherein the release lever 5 was pivoted by means of the control member 17 so far that the pawl 4 was moved out of engagement with the rotary latch 3. The locking mechanism is unblocked and a lock holder can be released from rotary latch 3. As can be seen from FIG. 6, the control member 17 is also engaged with the control lever 7 in the open position of the locking mechanism, so that a locked state is obtained. The motor vehicle lock 1 can thus be opened manually either by means of the inside actuating lever or by means of the outside door handle. Opening by means of an inside door handle would only be possible if there was an independent actuating lever chain from the inside door handle to the release lever. The control member 17 consequently causes an unblocking of the locking mechanism in an actuating direction, in the direction of the arrow P3, whereas actuating the control member in the direction of the arrow P results in the unlocking of the motor vehicle lock 1. According to the invention, locking and unblocking of the locking mechanism can thus be realized by means of a drive unit 11 and two directions of actuation of the control member 17.

As an additional securing member, it is conceivable that the control lever 7 interacts with a mass inertia member (not shown), so that even when the motor vehicle lock is in an unlocked state and the actuating lever 8 is accelerated excessively, unblocking of the locking mechanism can be prevented by holding the control lever 7 in the starting position thereof. The mass inertia member counteracts an external impulse and keeps the control lever 7 in the starting position thereof, which in turn causes the coupling lever 9 to be disengaged from the release lever 5 by means of the control curve 21.

LIST OF REFERENCE SIGNS

1 Motor vehicle lock
2 Locking mechanism
3 Rotary latch
4 Pawl
5 Release lever
6, 10, 18 Axis
7 Control lever
8 Actuating lever
9 Coupling lever
11 Drive unit
12 Electric motor
13 Worm gear
14 Output gear
15 First transmission stage
16 Second transmission stage
17 Control member
19 Control cam
20 Control contour
21 Control curve
A Starting position
B Actuation position
P, P1, P2, P3 Arrow

The invention claimed is:

1. An electrically actuatable motor vehicle lock, comprising:

a locking mechanism having a rotary latch and at least one pawl, a release lever, wherein the release lever interacts with the locking mechanism in such a way that a blocked locking mechanism can be unblocked, an electric drive unit and a manually actuatable actuating lever, wherein the release lever is actuatable by either one of the electric drive unit and the manually actuatable actuating lever, a locking unit, wherein manual unblocking of the locking mechanism is prevented by the locking unit, wherein the drive unit is configured to permit simultaneous locking of the manual actuatable actuating lever and unblocking of the locking mechanism, and a control lever, wherein the drive unit includes a control member, wherein the control member engages with the release lever in such a way that the control member blocks a movement of the control lever during actuation of the release lever, and a coupling lever that is arranged between the actuating lever and the release lever, wherein the coupling lever is configured such that when the actuating lever is actuated with a conventional actuation speed the coupling lever engages with the release lever and unblocks the locking mechanism, and when the control lever is blocked by the control member, then, when the actuating lever is moved, the coupling lever is deflected and the release lever is not actuated.

2. The motor vehicle lock according to claim 1, wherein the drive unit further includes an electric drive, a drive gear, and a drive pulley.

3. The motor vehicle lock according to claim 2, wherein the actuating lever engages with the release lever via the control lever.

4. The motor vehicle lock according to claim 3, wherein the control lever is blocked and released by the control member.

5. The motor vehicle lock according to claim 3, wherein the release lever is mounted on a common axis with the control lever and the actuating lever.

6. The motor vehicle lock according to claim 2, wherein the release lever is actuated by the control member.

7. The motor vehicle lock according to claim 2, wherein the control member engages with a control contour of the control lever during actuation of the release lever.

8. The motor vehicle lock according to claim 7, wherein the control member includes a control cam that engages with the control contour of the control lever.

9. The motor vehicle lock according to claim 2, wherein the control member is transferred by the drive unit into a release position in which the control lever is released and into a blocking position in which the control lever is blocked.

10. The motor vehicle lock according to claim 2, wherein the control lever interacts with a mass inertia-based securing system.

11. The motor vehicle lock according to claim 2, wherein the control member is pivotable and the release lever has an extension that extends into a pivoting range of the control member.

12. An electrically actuatable motor vehicle lock, comprising:

a locking mechanism having a rotary latch and at least one pawl, a release lever, wherein the release lever interacts with the locking mechanism in such a way that a blocked locking mechanism can be unblocked, an electric drive unit and a manually actuatable actuating lever, wherein the release lever is actuatable by either one of the electric drive unit and the manually actuatable actuating lever, a locking unit, wherein manual unblocking of the locking mechanism is prevented by the locking unit, and wherein the drive unit is configured to permit simultaneous locking of the manual actuatable actuating lever and unblocking of the locking mechanism, and a coupling lever that is arranged between the actuating lever and the release lever, wherein the coupling lever is configured such that when the actuating lever is actuated with a conventional actuation speed the coupling lever engages with the release lever and unblocks the locking mechanism, and when the control lever is blocked by the control member, then, when the actuating lever is moved, the coupling lever is deflected and the release lever is not actuated.

13. An electrically actuatable motor vehicle lock, comprising:

a locking mechanism having a rotary latch and at least one pawl, a release lever, wherein the release lever interacts with the locking mechanism in such a way that a blocked locking mechanism can be unblocked, an electric drive unit and a manually actuatable actuating lever, wherein the release lever is actuatable by either one of the electric drive unit and the manually actuatable actuating lever, a locking unit, wherein manual unblocking of the locking mechanism is prevented by the locking unit, and wherein the drive unit is configured to permit simultaneous locking of the manual actuatable actuating lever and unblocking of the locking mechanism, and a control lever, wherein the actuating lever engages with the release lever via the control lever, wherein the drive unit has an electric drive, a drive gear, a drive pulley, and a control member, and wherein the release lever is mounted on a common axis with the control lever and the actuating lever.

* * * * *